April 2, 1968     D. F. RUTLAND ET AL     3,376,416

THERMOLUMINESCENT DOSIMETRY SYSTEM

Filed April 6, 1964     6 Sheets-Sheet 1

DAVID F. RUTLAND
RICHARD C. PALMER
ERNEST F. BLASE
*INVENTORS*

BY *Cadwallader and Kelly*

ATTORNEYS

April 2, 1968 D. F. RUTLAND ET AL 3,376,416
THERMOLUMINESCENT DOSIMETRY SYSTEM
Filed April 6, 1964 6 Sheets-Sheet 3

DAVID F. RUTLAND
RICHARD C. PALMER
ERNEST F. BLASE
INVENTOR.

BY Cadwallader and Kelly

ATTORNEYS

April 2, 1968  D. F. RUTLAND ETAL  3,376,416
THERMOLUMINESCENT DOSIMETRY SYSTEM
Filed April 6, 1964  6 Sheets-Sheet 4

DAVID F. RUTLAND
RICHARD C. PALMER
ERNEST F. BLASE
*INVENTORS*

BY Cadwallader And Kelly

ATTORNEYS

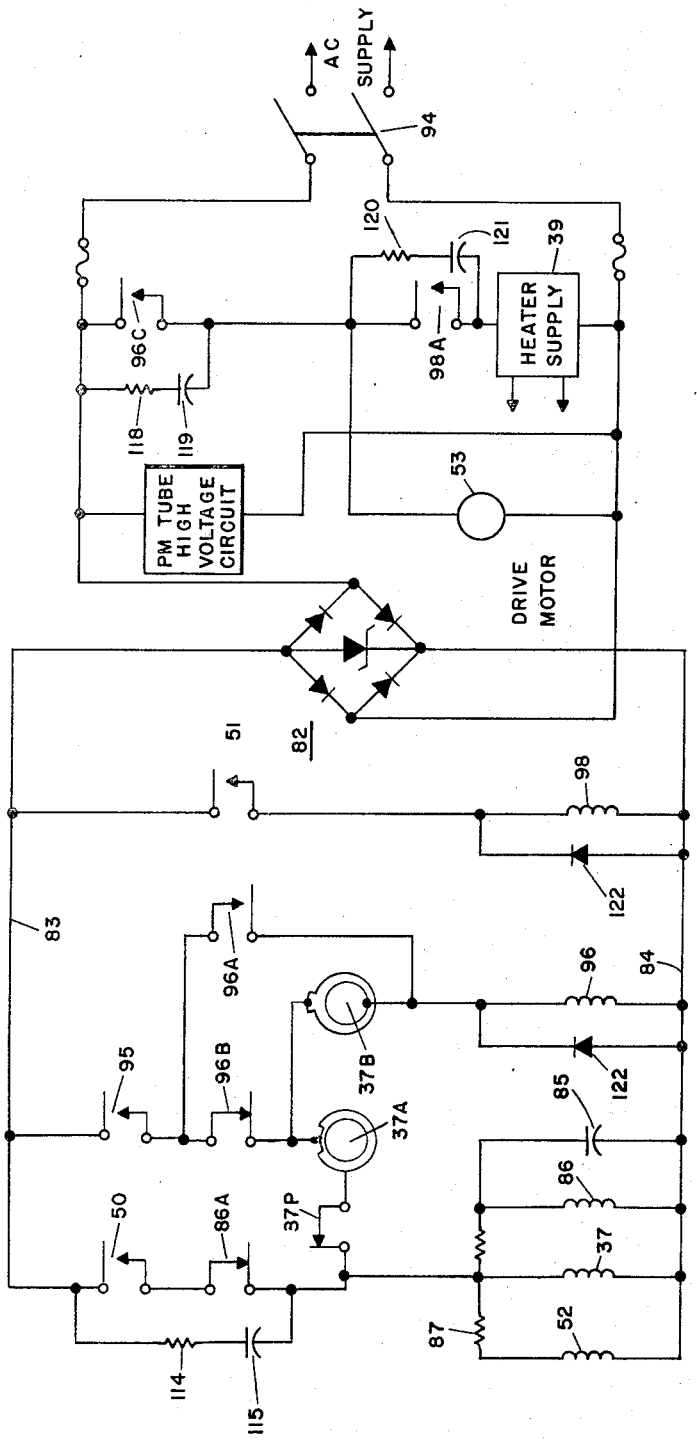

DAVID F. RUTLAND
RICHARD C. PALMER
ERNEST F. BLASE
*INVENTORS*

United States Patent Office 3,376,416
Patented Apr. 2, 1968

3,376,416
THERMOLUMINESCENT DOSIMETRY SYSTEM
David F. Rutland, Santa Barbara, Richard C. Palmer, Goleta, and Ernest F. Blase, Santa Barbara, Calif., assignors to E G & G, Inc., a corporation of Massachusetts
Filed Apr. 6, 1964, Ser. No. 357,512
9 Claims. (Cl. 250—71.5)

ABSTRACT OF THE DISCLOSURE

A thermoluminescent dosimetry recording system adapted to record on a special chart record glow curves of thermoluminescent materials exposed to varying amounts of ionizing radiation, having means for supplying constant heating current to heater elements disposed adjacent said thermoluminescent materials, photomultiplier means disposed to detect the emitted glow and adapted to produce an electrical signal proportional thereto, and recording means connected to the photomultiplier means for recording the electrical signal on the chart record at a constant rate and including circuitry for automatically changing ranges.

---

This invention relates to thermoluminescent dosimetry and more particularly to apparatus for reading the total radiation to which a thermoluminescent dosimeter has been exposed.

A number of attempts have been made to apply the energy storage properties of thermoluminescent manganese-activated calcium fluoride ($CaF_2$:Mn) to dosimetry. $CaF_2$:Mn emits light when heated after exposure to ionizing radiation. Such radiation excites the electronic structure in the crystal, freeing electrons which are able to travel in the conduction band. Some will be trapped in the metastable levels of the $CaF_2$:Mn crystal where they remain for some time. Heat releases these trapped electrons and they may lose their energy in small increments to the crystal lattice, or they may emit light, in which case they become fixed in the crystal at the emission center. The plot of emitted light versus temperature is called a "glow curve." Two such curves 20 and 21 are illustrated in FIGURE 1. Curve 20 represents light emitted by electrons originally freed by ultraviolet radiation, whereas curve 21 represents light emitted by electrons originally freed by gamma radiation. Both the area under the high temperature peak 22 which occurs at about 280° C. for gamma radiation and its peak amplitude are proportional to the total gamma radiation dose. Heating to measure the gamma radiation dose discharges the thermoluminescent $CaF_2$:Mn, which is thereafter ready to register a new exposure as soon as it cools.

Typical prior art laboratory apparatus for recording a "glow curve" 21 for gamma radiation is disclosed in The Review of Scientific Instruments for December 1960, in an article entitled "New Thermoluminescent Dosimeter" by James H. Schulman et al. The disclosed apparatus comprises an end-on photomultiplier tube with associated power supply (about 900 volts), a direct current amplifier and a chart recorder. A blue-green optical filter transmits the light emitted by the thermoluminescent dosimeter to the photomultiplier tube and excludes most of the longer wavelength blackbody radiation resulting from heating the dosimeter.

Thermoluminescent $CaF_2$:Mn dosimeters can be exposed to doses of ionizing gamma radiation ranging from 1 milliroentgen to more than 5,000 roentgens and faithfully store an indication of the total dose received. With photomultiplier tubes presently available, the direct current amplifier of the prior art is not needed since sufficient current output is available over, for example, a dose range of 5 milliroentgens to 5,000 roentgens of gamma radiation. One difficulty with the above prior art apparatus is that the recorder simply cannot record doses over such a range without utilizing some means for effecting range changes which is not disclosed. Another difficulty is that no means is provided whereby relatively untrained personnel can distinguish between glow curves for ultraviolet, gamma and blackbody radiations. Thus it is obvious that such laboratory apparatus does not lend itself to commercial utilization.

Accordingly, it is an object of the present invention to provide commercially practicable apparatus for measuring gamma radiation that does not have the disadvantages of the prior art laboratory apparatus.

A further object is to provide apparatus for measuring the total gamma dose to which thermoluminescent dosimeters have been subjected over a range of 5 milliroentgens to 5,000 roentgens.

Still another object of the present invention is to provide apparatus of the character described which permits distinguishing between ultraviolet radiations and gamma radiations.

Another object is to provide in such apparatus one chart record and means for recording five decades of ionizing gamma radiation doses thereon.

It will be appreciated that commercially practicable apparatus of the character described must be capable of simple, easy and accurate calibration by those untrained in the thermoluminescent dosimetry art. Thus, it is a further object to provide in such apparatus means for simple, easy and accurate calibration.

Still a further object is to provide means at the lowest dose range (50 milliroentgens full scale) for distinguishing among ultraviolet, gamma and blackbody radiations.

A further object is to provide a permanent record of the glow curve of the gamma radiation dose to which a thermoluminescent dosimeter has been subjected.

Still a further object of the invention is to provide a system for measuring in terms of total dose the peak light intensity emitted by a heated, gamma-radiation-exposed thermoluminescent dosimeter.

Other presently available dosimetry systems involve human performance of various functions and the formation of judgments. In film badge dosimetry, for example, humans develop the exposed film badge, place the developed negative in a reader, read the negative, forming judgments when they so do, and make written entries of the exposure dose and the film badge number. Humans make errors in performing these functions and forming these judgments. In some instances it has been necessary that the developed film badge be removed from storage for rereading to correct such errors. In other instances whole batches of developed film badges have had to be discarded because of errors made in their development. In the present invention no human functions or judgments are performed after the dosimeter is inserted into the apparatus and until the "glow curve" appears on the visual record.

Thus, another object of the invention is to reduce the number of human functions performed and human judgments made when measuring the gamma radiation dose to which a thermoluminescent dosimeter has been exposed.

Various other objects and advantages will appear from the following description of the invention, and the novel features thereof will be particularly pointed out in the appended claims.

Figure 9:
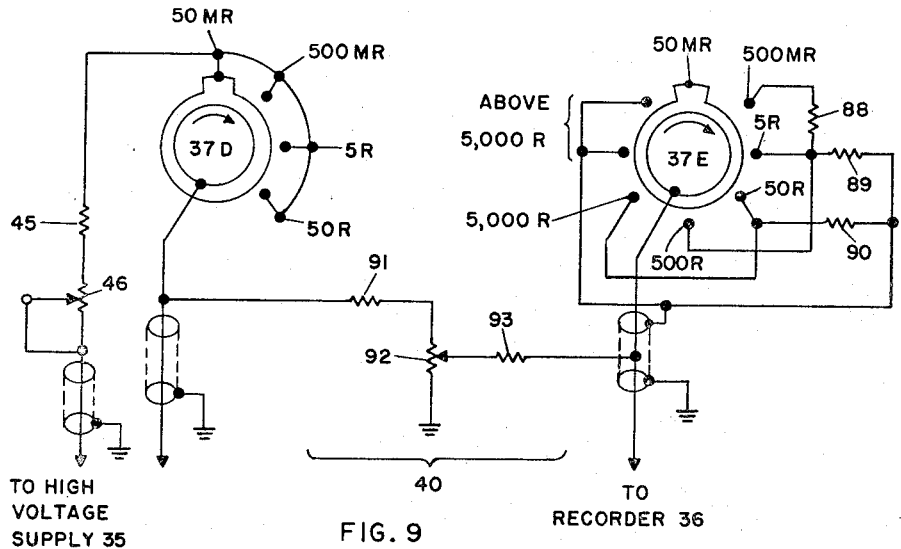
Figure 11:
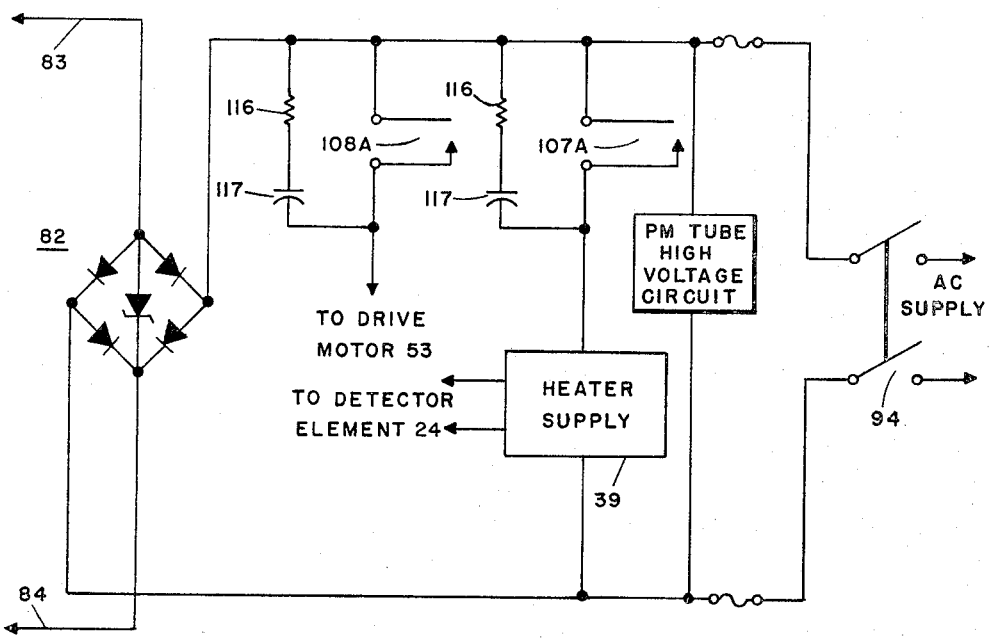
Figure 12:
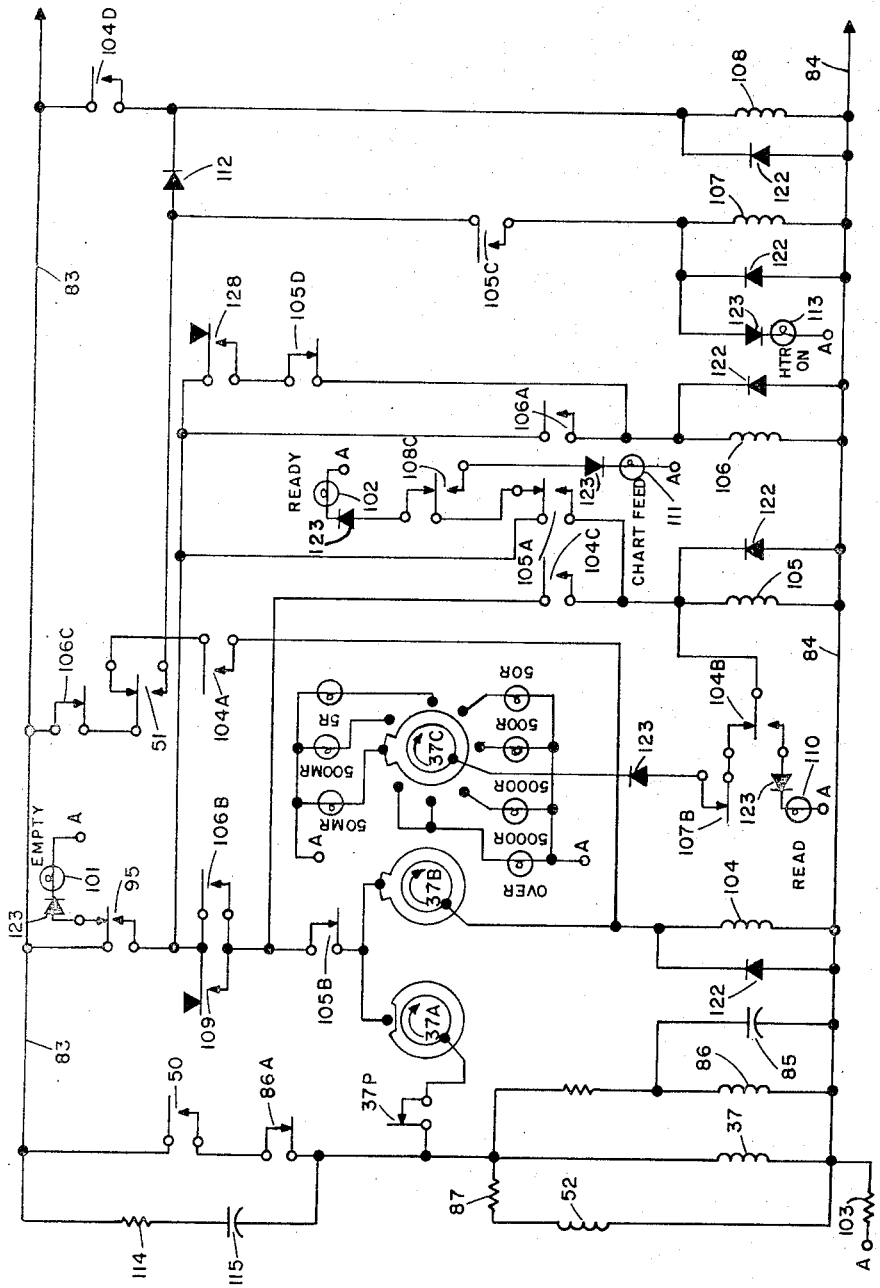

FIGURES 9 and 10 taken together comprise a schematic diagram of a simplified embodiment of the present invention;

FIGURES 11, 12 and 9 taken together comprise a schematic diagram of a complex embodiment of the invention; and FIGURE 13 illustrates a thermoluminescent standard.

THERMOLUMINESCENT DOSIMETER

Figure 2:
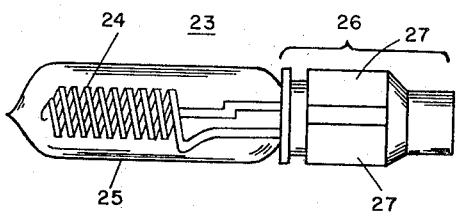
FIGURE 2 illustrates in part a thermoluminescent dosimeter.

FIGURE 2 illustrates, in part, a typical thermoluminescent dosimeter 23 without its shield and case which are not shown. Dosimeter 23 and a number of other dosimeter configurations are disclosed in U.S. Patent No. 3,115,578 issued on December 24, 1963 to Dr. James H. Schulman. Dosimeter 23 comprises detector element 24, glass envelope 25 and base 26. Detector element 24 comprises an electric heater coil of Nichrome wire coated with a 1:1 mixture of aqueous potassium silicate and powdered thermoluminescent $CaF_2$:Mn that has hardened at room temperature to a translucent, hard, adhering mass. Glass envelope 25 encompasses detector element 24 and may be evacuated, or filled at atmospheric pressure with a gas that has a low thermal conductivity, that will not luminesce when heated, and that is inert. Argon meets these requirements. It must have a low thermal conductivity so the heater coil may be heated rapidly without losing too much heat. It must not produce light when heated, otherwise erroneous readings of exposure would be obtained. It must be inert and not react with the thermoluminescent $CaF_2$:Mn destroying its sensitivity to ionizing radiation. Base 26 contains electrical contacts 27 that are connected to the Nichrome heating element of detector element 24. Contacts 27 connect to a source of heating current as will be explained later.

GENERAL DESCRIPTION

Figure 3:
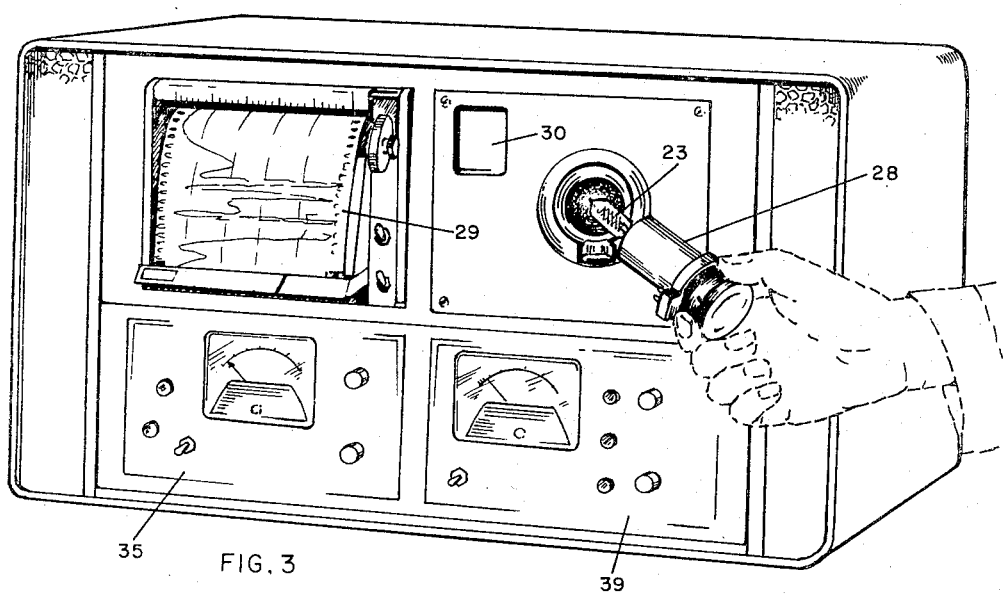
FIGURE 3 illustrates the front panel of the preferred embodiment of the present invention and shows a thermoluminescent dosimeter being inserted into the apparatus for reading.
Figure 4:
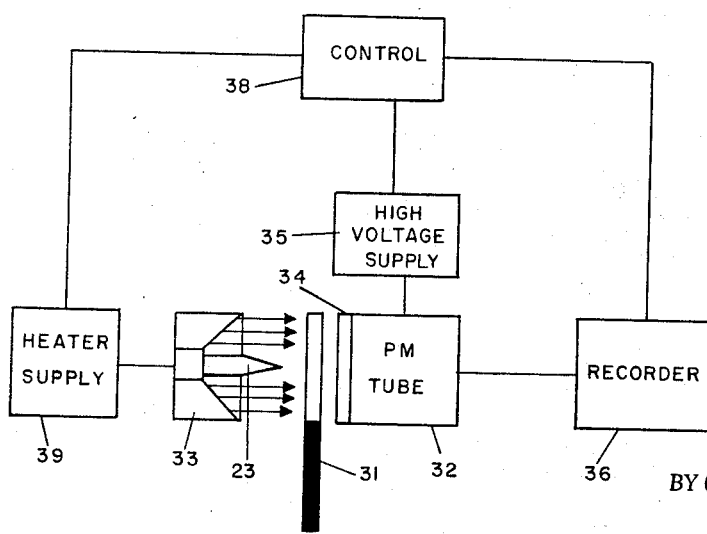
FIGURE 4 is a block diagram of major components of the present invention.

It is to be understood that the embodiments described in detail hereafter are illustrative of the general principles of the invention. Details are supplied in some instances to assure disclosure of operable systems. In FIGURE 3 the front panel of a complex embodiment shows thermoluminescent dosimeter 23 mounted in dosimeter holder 28, both being inserted into the apparatus, chart paper 29, and function screen 30. It will be apparent upon perusal of the prior art cited above that those skilled in the art will easily be able to device a number of thermoluminescent dosimer configurations and combinations of thermoluminescent material and heating elements that may be accommodated by dosimeter holder 28. Accordingly, it is not contemplated that dosimeter 23 or any equivalent configuration or combination form any part of the present invention. Referring now to FIGURE 4, inserting dosimeter holder 28 mechanically operates shutter 31. Shutter 31 opens only when dosimeter holder 28 is in position, thus preventing ambient light from otherwise impinging upon photomultiplier tube 32. Dosimeter 23 is positioned in conical mirror 33 which directs light from dosimeter 23 onto photomultiplier tube 32 through blue-green filter 34. Blue-green filter 34 prevents some, but not all, of the blackbody radiations from heated dosimeter 23 from impinging on photomultiplier tube 32. High voltage supply 35 is adjustable, as will be hereinafter explained, to standardize the light sensitivity and to change the gain of photomultiplier tube 32. The signal from photomultiplier tube 32 is measured directly by recorder 36. Recorder 36 together with the various switches and relays of control 38 perform the functions necessary for recording a glow curve and determining the total gamma radiation to which a thermoluminescent dosimeter 23 has been subjected. These control the turn-on times for the drive motor of recorder 36 and heater supply 39, which supplies constant heating current to dosimeter detector element 24 to insure proper heating rate.

HIGH VOLTAGE SUPPLY

Figure 5:
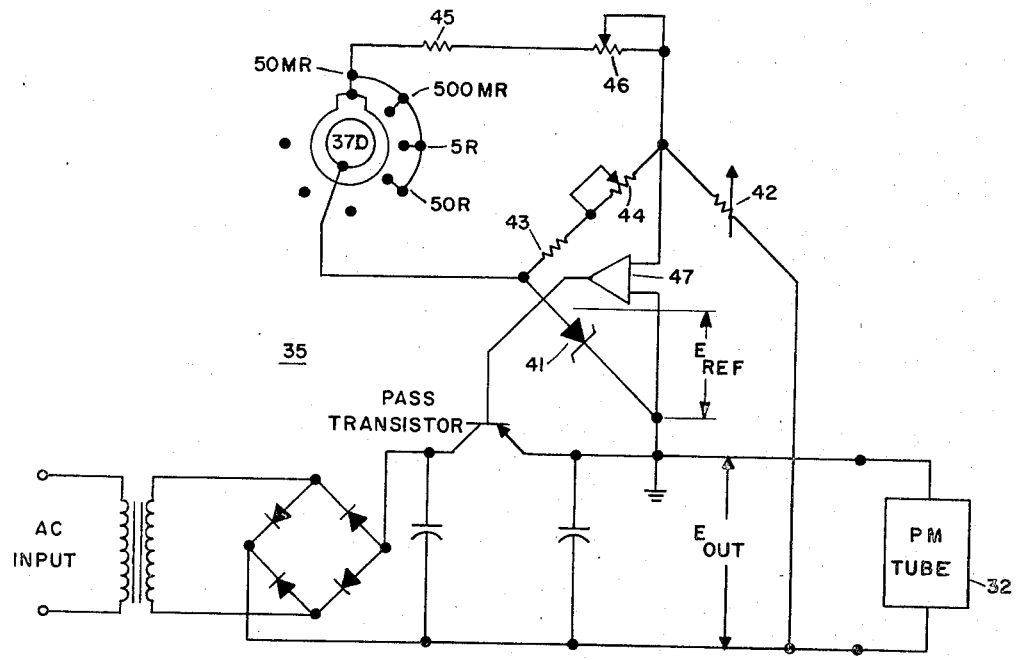
FIGURE 5 is a schematic diagram of a typical high voltage supply that may be used in the present invention.

FIGURE 5 illustrates a typical high voltage supply 35 for photomultiplier tube 32, modified to meet the requirements of the present invention. Reference voltage, $E_{REF}$, appears across Zener diode 41. The parallel combination of resistor 43, potentiometer 44, resistor 45 and potentiometer 46 may be called $R_P$. Those skilled in the art will recognize that error amplifier 47 together with the circuitry illustrated keeps the error signal very small so that $$\frac{E_{OUT}}{E_{REF}} = \frac{R_P}{R_{42}}$$

Thus, $E_{OUT}$ is proportional to changes in $R_P$. Potentiometer 46 may be adjusted to a value such that, when deck 37D of range step switch 37 steps above the 50R position, $E_{OUT}$ changes to a value that reduces the gain of photomultiplier tube 32 by exactly 100. Variable resistor 42 is adjusted during calibration as will be explained later.

RECORDER

Figure 6:
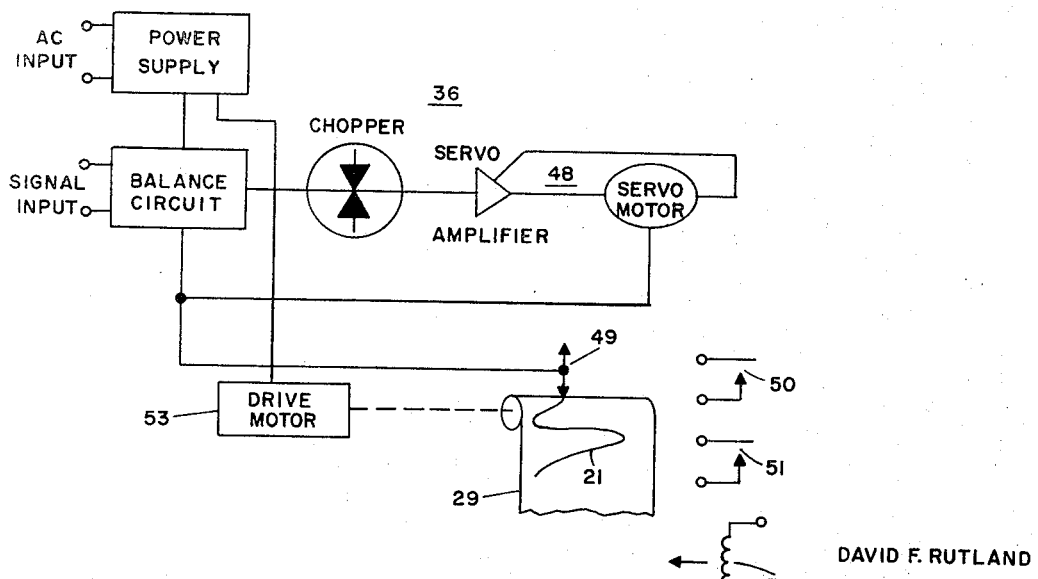
FIGURE 6 is a block diagram of a typical recorder modified for use in the present invention.

FIGURE 6 illustrates schematically a typical recorder 36 modified to meet the requirements of this invention. Recorder 36 uses an independent, self-balancing servo system 48, isolated from ground, to move pen 49, and drive motor 53 to advance chart 29. In operation, servo system 48 moves recording pen 49 at right angles to the direction of motion of chart 29 in response to the output of photomultiplier tube 32. The resulting relative motion of pen 49 and chart 29 traces glow curves 21. The output of photomultiplier tube 32 is applied to the balance circuit where it is cancelled by an internally supplied opposing voltage. Under these conditions, there is no signal output from the balance circuit and servo system 48 is at rest. When the input signal changes to a new value, it is no longer cancelled in the balance circuit and the unbalance voltage, or error signal, is applied to the chopper where it is converted to 60 cycle form. The AC output of the chopper is amplified and applied to the servo motor control circuits. The servo motor is mechanically coupled to the balance circuit potentiometer and thus changes the balance voltage until it again cancels the new value of input signal. This rebalancing action is continuous as long as the output of photomultiplier tube 32 is changing. Thus, the position of the balance circuit potentiometer and of pen 49, to which it is coupled, is always directly proportional to the amplitude of the photomultiplier tube 32 output.

Recorder 36 is equipped with limit switch 50, cam switch 51 and event marker 52. Limit switch 50 is mounted in such manner that it closes when pen 49 reaches full scale on chart 29. Cam switch 51 is mounted in such manner that it closes only when it is desirous that pen 49 record a glow curve 21. Event marker 52 is connected so that it traces a mark on chart 29 when energized by the circuit operated by limit switch 50. The detailed functioning of these additional components will be explained hereafter.

HEATER CURRENT REGULATOR CIRCUIT

Figure 7:
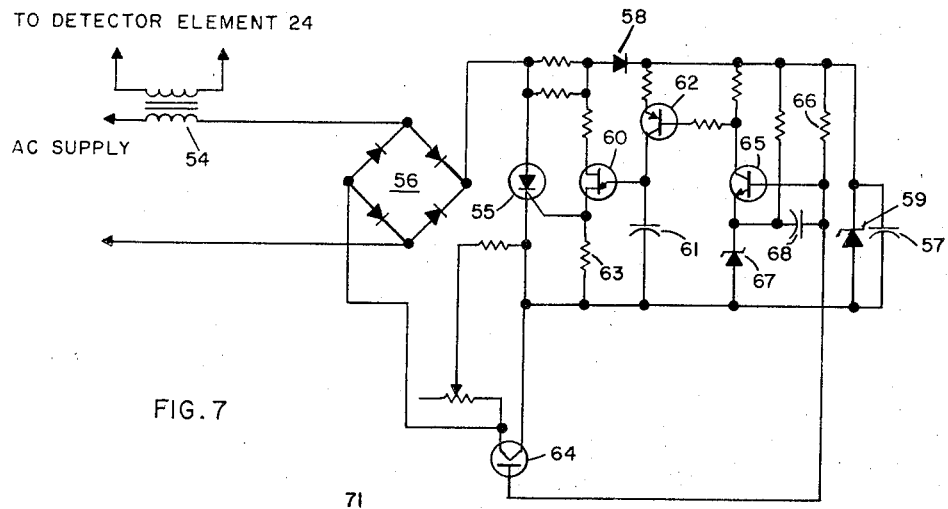
FIGURE 7 is a schematic diagram of a typical heater supply circuit that may be used in the present invention.

FIGURE 7 illustrates the heater current supply. The heater current required by detector element 24 must be constant as will be explained hereinafter. Standard filament transformer 54 supplies this current under the control of a regulator circuit which limits the primary current to produce the correct secondary current. Silicon controlled rectifier 55 is phase-controlled so that it is turned on for only part of the AC cycle and thereby limits the current to the primary of transformer 54. Rectifier bridge 56 produces full-wave rectified voltage across silicon controller rectifier 55. Part of this voltage charges capacitor 57 through rectifier 58. Zener diode 59 regulates the voltage across capacitor 57.

At the beginning of a half cycle, the voltage across silicon controlled rectifier 55, transistor 60 and capacitor 61 is zero. Capacitor 61 charges through transistor 62 at a rate depending on the base voltage on transistor 62. When the emitter of transistor 60 reaches its critical value, transistor 60 fires, discharges capacitor 61 and produces a positive spike across resistor 63 which triggers silicon controlled rectifier 55 which then conducts for the rest of the half cycle and the sequence begins again for the next half cycle. Current pulses are thus delivered to transformer 54 each half cycle when silicon controlled rectifier 55 is fired. The current flows through the filament of thermionic diode 64, heats the filament and produces an electron emission current determined by the RMS value of the filament current. The plate of diode 64 collects the electron emission current which controls the charging time of capacitor 61 by way of amplifier transistors 62 and 65. The plate current of diode 64 produces a voltage drop across resistor 66. Transistor 65 compares this with the voltage across Zener diode 67. The difference voltage, amplified by transistor 65, adjusts the bias on transistor 62, and varies the charging current to capacitor 61. Capacitor 68 smooths the anode current of diode 64 and stabilizes the regulator.

RECORDER CHART PAPER

Figure 8:
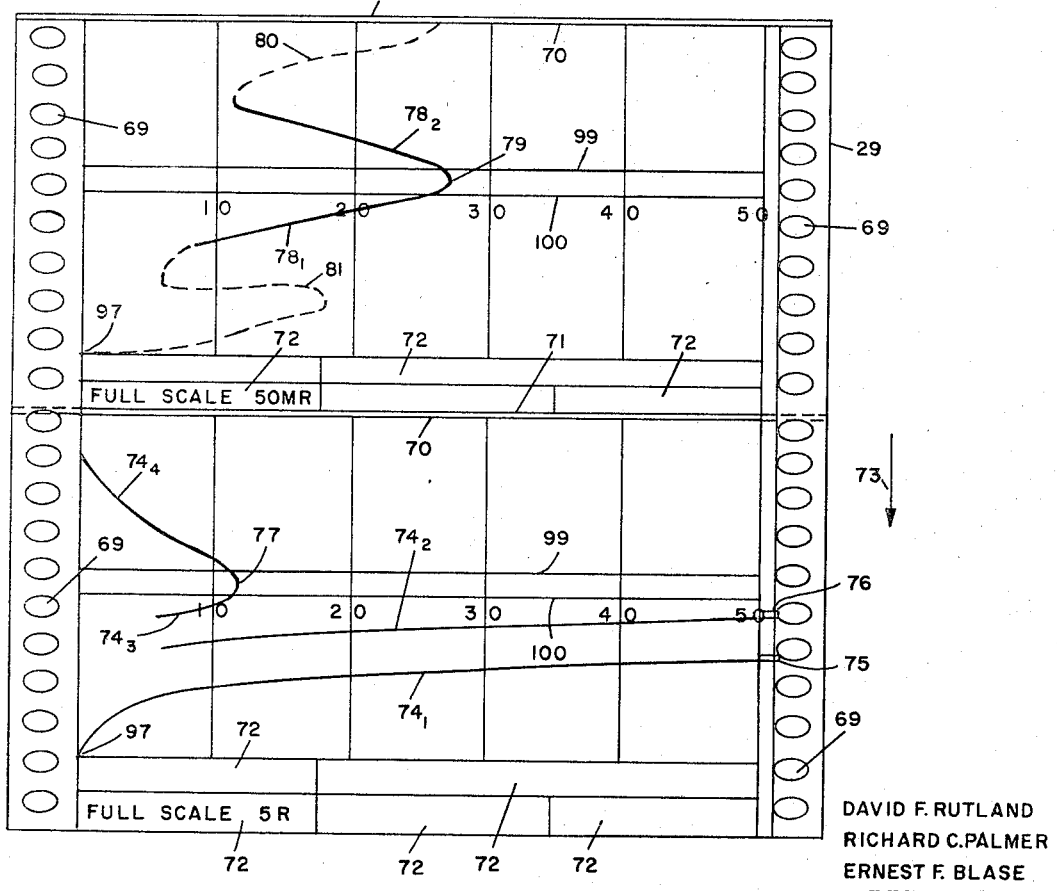
FIGURE 8 illustrates typical glow curves recorded on the chart paper used in the present invention.

It will facilitate later understanding next to describe chart paper 29 and the various curves illustrated in FIGURE 8. Chart paper 29 may have sprocket drive holes 69 along one edge, or both edges as illustrated. Perforations along lines 70 and 71 facilitate tearing off records of readings of individual dosimeters 23. Spaces 72 may be provided on each record for entering the serial number of dosimeter 23, the name of the person to whom it was issued, the date the record was made, the dose reading, and other information that may be desired. Note that in the two records illustrated in FIGURE 8 one space 72 has been used to indicate the full scale reading for that particular record. Taking the lower record, and with the chart motion indicated by the direction of arrow 73, glow curve 74 rose in amplitude along $74_1$ to the right edge where pip mark 75 (made by event marker 52) indicates that a scale change occurred from a full scale range of 50 milliroentgens to 500 milliroentgens. Glow curve 74 then rose in amplitude along $74_2$ to the right edge, again, where pip mark 76 (also made by event marker 52) indicates that another scale change occurred from 500 milliroentgens to 5 roentgens. Glow curve 74 then rose along $74_3$ to peak 77 and then dropped off along $74_4$. Peak 77 indicates that the dose was about 1.2 roentgens. In the upper record, glow curve 78 rose in amplitude along $78_1$ to peak 79 and then dropped off along $78_2$. Note that blue-green optical filter 34 (see FIGURE 4) did not exclude blackbody radiation of heated dosimeter 23. This radiation is represented by dashed line 80. Dashed curve 81 indicates that dosimeter 23 was subjected to a considerable amount of ultraviolet radiation. Thus in the upper record three types of radiation have been recorded. Peak 79 of glow curve 78 for gamma radiation occurs at about 27 milliroentgens, the full scale of this record being 50 milliroentgens.

OPERATION OF RANGE STEP SWITCH 37

Direct current power is supplied along mains 83 and 84 by bridge rectifier 82 from the AC supply as illustrated in FIGURES 10 and 11. Referring to FIGURES 10 and 12, limit switch 50 on recorder 36 operates when pen 49 reaches full scale and energizes the coil of range step switch 37. Concurrently event marker 52 in recorder 36 is energized through resistor 87 to produce a pip mark 75 or 76 on chart paper 29, as illustrated in FIGURE 8. Range step switch 37 immediately steps to the next higher range position. If pen 49 of recorder 36 then comes on scale, limit switch 50 opens and turns off range step switch 37 which is then ready to make another advance. However, if the current output of photomultiplier tube 32 is high, pen 49 may remain at full scale. In this case, after a time delay determined by capacitor 85 across the coil of relay 86, relay 86 operates and contact 86A breaks the current to range step switch 37. After further delay, capacitor 85 is discharged, relay 86 drops out, and, if pen 49 is still at full scale, energizes range step switch 37 and event marker 52 a second time. Range step switch 37 will thus be successively actuated until a range is reached where pen 49 remains on scale.

SCALE CHANGE CIRCUITRY

Scale changes are accomplished by range step switch decks 37D and 37E (see FIGURE 9). Assume that recorder 36 has an input resistance of 100,000 ohms. Deck 37E may be arranged to place shunts across this input resistance so as to reduce the current sensitivity of recorder 36 by factors of 10 for each step. Thus, in the 50 milliroentgen position, desk 37E is open-circuited and all the output current of photomultiplier tube 32 flows through recorder 36. In the 500 milliroentgen position resistors 88 and 89 (connected in series) shunt the input resistance of recorder 36. Thus, with 100,000 ohms input resistance, resistor 88 would have a value of 10,000 ohms and resistor 89 would have a value of 1,000 ohms. In the 5 roentgen position of deck 37E, only resistor 89 would shunt the input of recorder 36. In the 50 roentgen position of deck 37E resistor 90 shunts the input of recorder 36. In this case, with the assumed input resistance, resistor 90 would have a value of 100 ohms. Above the 50 roentgen range it is desirable that the high voltage available to photomultiplier tube 32 be reduced by a factor that will reduce photomultiplier tube 32 gain by a factor of 100, instead of reducing further the current sensitivity of recorder 36. This may be accomplished by deck 37D of range step switch 37, as heretofore explained in connection with FIGURE 5. Potentiometer 46 may be adjusted to such value that opening the series circuit with deck 37D reduces the gain of photomultiplier tube 32 precisely by a factor of 100. Thus, in the 500 roentgen position of decks 37D and 37E the gain of photomultiplier tube 32 has been reduced by 100. However, the current sensitivity of recorder 36 has been increased by 10 over the 50 roentgen position so as to result in an overall reduction of 10 in sensitivity. In this position only resistor 89 is across the input of recorder 36. In the 5,000 roentgen position deck 37E places resistor 90 across the input to recorder 36, thus reducing its current sensitivity by 10. In the OVER 5,000 roentgen position the recorder 36 input is short circuited.

DARK CURRENT ADJUST CIRCUIT

The series circuit consisting of resistor 91, part of potentiometer 92 and resistor 93 derives a current from high voltage supply 35 to oppose the dark current of photomultiplier tube 32. Resistor 93 must be large, such as 10 megohms, so as to minimize any change in the sensitivity of recorder 36 due to its shunting effect across the input of recorder 36.

SIMPLIFIED EMBODIMENT

It will facilitate later understanding first to describe the simplified embodiment of the invention illustrated in FIGURES 9 and 10. The operation of range step switch 37 and decks 37D and 37E to accomplish range changes, and the dark current adjust circuit 40 have been explained and are the same in both embodiments. Before the circuit is turned on all switch and relay contacts are in the position illustrated in FIGURE 10, except that decks 37A, 37B, 37D and 37E of range step switch 37 may be in any position. Closing switch 94 turns on AC power and bridge rectifier 82 supplies DC power along mains 83 and 84. Insertion of dosimeter holder 28 with a dosimeter 23 operates switch 95. If deck 37A is not in the 50 milliroentgen position illustrated in FIGURE 10, the coil of range step switch 37 is energized through its breaker points 37P. Breaker points 37P interrupt the current in the coil of range step switch 37 when it is energized, thereby causing range step switch 37 to step or motor at a high rate to the 50 milliroentgen position at which point deck 37A opens the circuit. Thus range step switch 37 is set to the 50 milliroentgen position before recording begins.

At the 50 milliroentgen position, deck 37B operates relay 96. The contacts of relay 96 perform the following functions.

Contact 96A: Holds relay 96 operated.
Contact 96B: Opens the circuit between deck 37A and switch 95. Range step switch 37 is now controlled only by limit switch 50.
Contact 96C:
    Closes the AC circuit to start chart drive motor 53.
    Makes AC power available at contact 98A.

When pen 49 reaches the origin 97 (see FIGURE 8) of the chart record, cam switch 51 operates. Relay 98 operates and contact 98A closes the AC circuit to heater supply 39.

Heater supply 39 furnishes constant heater current to detector element 24 through contacts 27 of dosimeter 23. As the temperature of dosimeter 23 rises, pen 49 of recorder 36 traces the glow curve, producing a record such as is illustrated in FIGURE 8. When the chart drive reaches the end of the chart record, line 70, cam switch 51 opens, relay 98 drops out and heater supply 39 is turned off. Dosimeter holder 28 with dosimeter 23 is removed; switch 95 opens; and relay 96 drops out. The circuit is ready to read another dosimeter. Note that while the record of a glow curve was being made, range step switch 37 may have been operated by limit switch 50 to change ranges. Decks 37D and 37E accomplished this as heretofore described.

Figure 1:
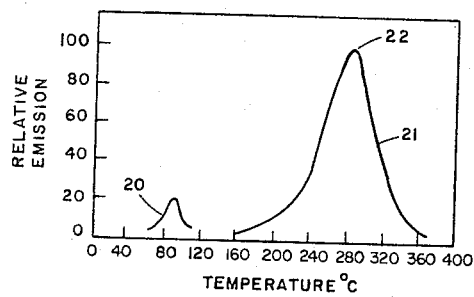
FIGURE 1 is a graph illustrating ultraviolet and gamma "glow curves" recorded from a typical thermoluminescent ($CaF_2$:Mn) dosimeter.

FIGURE 1 illustrates that the peak of glow curve 20 for ultraviolet radiation occurred at about 100° C. and that the peak 22 of glow curve 21 for gamma radiation occurred at about 280° C. Thermoluminescent dosimeters 23 now being manufactured in commercial quantities have such tolerances that their characteristics are reproducible within acceptable limits from dosimeter to dosimeter. This means that, if constant heating current is supplied to detector element 24 through contacts 27, the $CaF_2$:Mn on each detector element 24 rises in temperature at substantially the same rate for all dosimeters. Thus, with constant current, all dosimeters will rise to 100° C. and to 280° C. in the same times. For example, with a constant current of 6.5 amperes all detector elements 24 of one type of thermoluminescent dosimeter 23 rise to 280° C. in approximately 10 seconds. The same considerations apply to the other thermoluminescent dosimeter configurations and combinations of thermoluminescent materials and heating elements heretofore discussed. The apparatus of the present invention regulates heater current very precisely and maintains chart drive speed constant so that the peak of the glow curve for gamma radiation always falls between lines 99 and 100 of a chart record, as is illustrated in FIGURE 8. Referring again to the upper record of FIGURE 8, note that the glow curve 81 for ultraviolet radiation occurs well below the peak 79 for gamma radiation. A glow curve falling below line 100 and peaking approximately where curve 81 peaks can always be identified as an ultraviolet-produced glow curve. Larger doses of ultraviolet radiation produce glow curves with higher peaks well below line 100. Blue-green filter 34 (see FIGURE 4) is designed to exclude some, but not all of the blackbody radiations emanating from a heated dosimeter 23. This will be recorded only when the full scale range for a particular record is 50 milliroentgens. Thus, in the upper record of FIGURE 8, curve 80 illustrates that the glow curve for blackbody radiation always appears above line 99 and rises in amplitude. To summarize, utilizing constant heating current and constant chart speed, the apparatus always records the peak of the glow curve for gamma radiation between lines 99 and 100; whereas it records the peak for ultraviolet radiation below line 100 and the curve for blackbody radiation well above line 99. At scale ranges greater than 50 milliroentgens, the curve for gamma radiation overrides the curve for blackbody radiation which is not recorded, as illustrated in the lower record of FIGURE 8.

COMPLEX EMBODIMENT

Initial operations

Before the circuit is turned on all switch and relay contacts are in the positions illustrated in FIGURE 12 except that decks 37A, 37C, 37D and 37E of range step switch 37 may be in any position. When power is turned on, EMPTY lamp 101 lights if dosimeter holder 28 is not in place and the word "EMPTY" appears on function screen 30 of FIGURE 3. When dosimeter holder 28 is in place, switch 95 operates, EMPTY lamp 101 turns off and READY lamp 102 turns on through contacts 105A and 108C of unoperated relays 105 and 108. The word "READY" appears on function screen 30. Note that the circuit for each function lamp may be traced from main 83, through various relay and switch contacts, through the lamp, to terminal A, through resistor 103 to main 84.

Depressing pushbutton switch 109 energizes the coil of range step switch 37 through its breaker points 37P and deck 37A, if deck 37A is not in the 50 milliroentgen position as illustrated in FIGURE 12. Breaker points 37P interrupt the current in the coil of range step switch 37 when it is energized, thereby causing range step switch 37 to step or motor at a high rate. Deck 37A opens this circuit when range step switch 37 reaches the 50 milliroentgen position. Thus range step switch 37 is set to the most sensitive range before the reading cycle starts.

READING CYCLE

When range step switch 37 has motored to the 50 milliroentgen position, deck 37B operates relay 104. The contacts of relay 104 perform the following operations.

Contact 104A: Holds relay 104 operated through cam switch 51 on recorder 36 and contact 106C of relay 106.
Contact 104B: Opens the circuit to the range lamps.
Contact 104B and Contact 104C: Turn on READ lamp 110.
Contact 104C: Also operates relay 105.
Contact 104D: Operates relay 108.

The contacts of operated relay 105 perform the following operations.

Contact 105A: Disconnects READY lamp 102; holds relay 105 operated through switch 95; maintains READ lamp 110 on. The word "READ" appears on function screen 30.

Contact 105B: Disconnects decks 37A and 37B of range step switch 37, so that range step switch 37 is now under the control of limit switch 50 only.

Contact 105C: Allows relay 107 to be operated during the heating cycle described below.

The contacts of operated relay 108 perform the following operations.

Contact 108A: Starts drive motor 53 of recorder 36 (see FIGURE 11).

Contact 108C: Furnishes power to CHART FEED lamp 111 when relay 105 drops.

When the chart drive reaches origin 97 (see FIGURE 8) of a chart record, cam switch 51 operates; relay 104 drops and relay 107 operates through contact 105C and contact 106C. The contacts of relay 107 perform the following operations.

Contact 107A: Turns on heater supply 39 (see FIGURE 11).

Contact 107B: Opens the circuit to the range lamps controlled by deck 37C as contact 104B returns to normal.

Note that after relay 104 drops, drive motor 53 of recorder 36 continues to run since relay 108 is held operated through rectifier 112. Contact 104B turns off READ lamp 110. The voltage across the coil of relay 107 energizes HTR ON lamp 113. The expression "HTR ON" appears on function screen 30. While heater supply 39 is turned on, heater current is supplied to the Nichrome heater wire of detector element 24. The temperature of the $CaF_2:Mn$ rises and pen 49 starts to trace the glow curve. If the gamma dose exceeds 50 milliroentgens, limit switch 50 on recorder 36 initiates a scale change as described above. Scale changes continue until pen 49 remains on scale. When the chart drive reaches line 70 (see FIGURE 8) of the graph record, cam switch 51 returns to its normal position. Relays 107 and 108 drop out. HTR ON lamp 113 turns off and contact 107A turns off heater supply 39. Contact 107B then turns on the appropriate range light indication as selected by deck 37C of range step switch 37. The range appears on the function screen 30. Drive motor 53 of recorder 36 stops, ending the reading cycle.

When dosimeter holder 28 is removed, switch 95 returns to its normal position dropping out relay 105, restoring the circuit to its initial condition, except that range step switch 37 is left in its final position.

Those skilled in the art will recognize the arc suppression function performed by the following resistor-capacitor combinations.

FIGURES 10 and 12: Resistor 114 and capacitor 115
FIGURE 11: Resistors 116 and capacitors 117
FIGURE 10:
    Resistor 118 and capacitor 119
    Resistor 120 and capacitor 121

Selenium breakdown diodes 122 across the coils of relays 104, 105, 106, 107 and 108 of FIGURE 12 and the coils of relays 96 and 98 of FIGURE 10 prevent arcing across relay and switch contacts in circuit with said coils as a result of the voltages produced by the collapsing magnetic fields in said coils when their respective relays are dropped. Diodes 123 in FIGURE 12 prevent current from flowing backwards from point A through lamps that are off.

CALIBRATION

The apparatus of the present invention utilizes the thermoluminescent standard 124 disclosed in application for United States Letters Patent Ser. No. 215,888, filed Aug. 9, 1962 by Ernest F. Blase et al., U. S. Letters Patent No. 3,239,665, for calibration since its light characteristic corresponds to that of a heated thermoluminescent dosimeter. Thermoluminescent standard 124 and thermoluminescent dosimeter 23 have substantially identical normalized thermoluminescent and fluorescent light output curves. Thermoluminescent standard 124 is illustrated in FIGURE 13. Note that it has the same configuration as dosimeter 23, but that it does not have heater contacts 27. Thus it fits into dosimeter holder 28. Thermoluminescent standard 124 comprises element 125, glass envelope 126 and base 127. Element 125 comprises a coil of Nichrome wire coated with a mixture of aqueous potassium silicate, powdered thermoluminescent $CaF_2:Mn$ and a powdered radioactive isotope, such as Nickel 63 or Carbon 14, that has hardened to a translucent, hard, adhering mass. As disclosed in said patent, the radioactive isotope causes the $CaF_2:Mn$ to fluoresce producing a standard light output depending upon the amount of the radioactive isotope used. This light output can be calibrated to an equivalent total dose of gamma radiation. Glass envelope 126 encompasses element 125 and may be evacuated, or filled at atmospheric pressure with a gas that will not luminesce when subjected to radiation and that is inert. Base 127 is constructed so that it will fit into dosimeter holder 28. To calibrate, place dosimeter holder 28 with standard 124 in place in the apparatus, and depress pushbutton switch 128 of FIGURE 12. Relay 106 operates and holds through contact 106A. Contact 106B, in parallel with pushbutton switch 109, starts the read cycle described above, motoring range step switch 37 to the 50 milliroentgen position. Relay 104 operates just long enough to operate relay 105. Then, contact 106C drops out relay 104 and prevents relay 108 from operating. Thus drive motor 53 of recorder 36 does not run. Relay 105 remains held in through contact 105A and switch 95 and the range lamps are energized through deck 37C. Removing dosimeter holder 28 returns switch 95 to its normal position, drops out relays 104 and 105, returning the system to its initial condition.

To calibrate the system, first insert dosimeter holder 28 without a dosimeter 23 or standard 124 in place and depress pushbutton switch 128 of FIGURE 12. Adjust pen 49 in recorder 36 to zero with the dark current potentiometer 92 (see FIGURE 9). Then place standard 124 in dosimeter holder 28, insert it in the apparatus and depress pushbutton switch 128 again. Adjust variable resistor 42 of high voltage supply 35 until pen 49 on recorder 36 indicates the equivalent total dose.

It sometimes happens that cam switch 51 is accidentally operated when loading paper or for some other reason. When dosimeter holder 28 is inserted, cam switch 51 holds relay 108 operated and chart 29 will be driven to its final position. To warn the operator that the system is not yet ready for a new reading, contact 108C or relay 108 turns on CHART FEED lamp 111, and the expression "CHART FEED" appears on function screen 30.

To calibrate the simple embodiment of FIGURE 10, first insert dosimeter holder 28 without a dosimeter 23 or a standard 124. Adjust pen 49 on recorder 36 to zero with the dark current potentiometer 92 (see FIGURE 9) during the ensuing READ cycle. Then place standard 124 in dosimeter holder 28, insert it in the apparatus, and adjust variable resistor 42 of high voltage supply 35 until pen 49 on recorder 36 indicates the equivalent total dose during the ensuing READ cycle.

It will now be apparent that the objects of the invention have been accomplished. Thus (1) the means above described for changing ranges accommodates a total dose range of 5 milliroentgens to 5,000 roentgens; (2) the apparatus records the glow curves for ultraviolet, gamma and black-body radiations in easily distinguishable locations on a record, which are easily identified by untrained personnel having a minimum of instruction; (3) the invention provides commercially practicable apparatus for measuring gamma radiation doses; (4) moreover, the apparatus described measures gamma radiation doses over a range of 5 milliroentgens to 5,000 roentgens; (5) further, it provides a permanent record of the glow curves of gamma radiation; and (6) the apparatus provides means for simple, easy and accurate calibration by those untrained in the thermoluminescent dosimetry art.

It is to be understood that the above-described apparatus illustrates the application of the principles of the invention. Numerous other arrangements may be devised by those skilled in the art without departing from the spirit and scope of the invention.

What is claimed is:

1. Apparatus for recording at substantially the same location on each chart record the total dose of gamma-radiation-exposed thermoluminescent dosimeters of the type having thermoluminescent material that glows and produces a characteristic gamma radiation glow peak when heated above a critical temperature by an electrical heater element disposed adjacent thereto, which glow peak is a measure of the total gamma radiation dose, said apparatus comprising, in combination:

means for supplying, when energized, constant heating current to said electrical heating element to heat said thermoluminescent material to its critical temperature in substantially the same time for each dosimeter;

means disposed adjacent each said dosimeter for detecting the glow of said thermoluminescent material while it is being heated and producing an electrical signal proportional to the amplitude of said glow, including a peak signal proportional to said glow peak;

means connected to the output of said detecting and producing means for recording on said chart record at a constant rate, when energized, said electrical signal including said peak signal; and circuit means connected to said heating means and said recording means and adapted, when energized, first to energize said recording means, then to energize said heating means, and then, while said electrical signal is being recorded, to change the ranges of said recording means when required.

2. Apparatus as claim 1 further comprising means for calibrating said apparatus with a thermoluminescent standard.

3. Apparatus for recording at substantially the same location on each chart record the total dose of gamma-radiation-exposed thermoluminescent dosimeters of the type having thermoluminescent material that glows and produces a characteristic gamma radiation glow peak when heated above a critical temperature by an electrical heater element disposed adjacent thereto, which glow peak is a measure of the total gamma radiation dose, said apparatus comprising, in combination:

a regulated power supply for supplying, when energized, constant heating current to said electrical heating element to heat said thermoluminescent material to its critical temperature in substantially the same time for each dosimeter;

a photosensitive device with power supply disposed adjacent said dosimeter for detecting the glow of said thermoluminescent material while it is being heated and producing an electrical signal proportional to the amplitude of said glow, including a peak signal proportional to said glow peak;

means connected to the output of said photosensitive device for recording on said chart record at a constant rate, when energized, said electrical signal including said peak signal; and circuit means connected to said regulated power supply and said recording means and adapted, when energized, first, to energize said recording means, then to energize said regulated power supply, and then, while said electrical signal is being recorded, to change the ranges of said recording means when required.

4. Apparatus for recording at substantially the same location on each chart record the total dose of gamma-radiation-exposed thermoluminescent dosimeters of the type having thermoluminescent material that glows and produces a characteristic gamma radiation glow peak when heated above a critical temperature by an electrical heating element disposed adjacent thereto, which glow peak is a measure of the total gamma radiation dose, said apparatus comprising, in combination:

a regulated power supply for supplying, when energized, constant heating current to said electrical heating element to heat said thermoluminescent material to its critical temperature in substantially the same time for each dosimeter;

a photosensitive device with power supply disposed adjacent said dosimeter for detecting the glow of said thermoluminescent material while it is being heated and producing an electrical signal proportional to the amplitude of said glow, including a peak signal proportional to said glow peak;

a chart recorder, having a drive motor adapted to drive said chart at constant speed, connected to the output of said photosensitive device for recording on said chart record at a constant rate, when energized, said electrical signal including said peak signal; and circuit means connected to said regulated power supply and said chart recorder and adapted, when energized, first, to energize said drive motor, then to energize said regulated power supply, and then, while said electrical signal is being recorded, to change the ranges of said chart recorder when required.

5. Apparatus for recording at substantially the same location on each chart record the total dose of gamma-radiation-exposed thermoluminescent dosimeters of the type having thermoluminescent material that glows and produces a characteristic gamma radiation glow peak when heated above a critical temperature by an electrical heater element disposed adjacent thereto, which glow peak is a measure of the total gamma radiation dose, said apparatus comprising, in combination:

a regulated power supply for supplying, when energized, constant heating current to said electrical heating element to heat said thermoluminescent material to its critical temperature in substantially the same time for each dosimeter;

a photomultipler tube disposed adjacent said dosimeter for detecting the glow of said thermoluminescent material while it is being heated and producing an electrical signal proportional to the amplitude of said glow, including a peak signal proportional to said glow peak;

a high voltage power supply connected to said photomultiplier tube for furnishing high voltage thereto;

a chart recorder, having a drive motor adapted to drive said chart record at constant speed, connected to the output of said photomultiplier tube for recording on said chart record at a constant rate, when energized, said electrical signal including said peak signal; and circuit means connected to said regulated power supply and said chart recorder and adapted, when energized, first, to energize said drive motor, then to energize said regulated power supply, and then, while said electrical signal is being recorded, to change the ranges of said chart recorder when required.

6. Apparatus as in claim 5 further comprising means for calibrating said apparatus with a thermoluminescent standard.

7. Apparatus for recording at substantially the same location on each chart record the total dose of gamma-radiation-exposed thermoluminescent dosimeters of the type having thermoluminescent material that glows and produces a characteristic gamma radiation glow peak when heated above a critical temperature by an electrical heater element disposed adjacent thereto, which glow peak is a measure of the total gamma radiation dose, said apparatus comprising, in combination:

a regulated power supply for supplying, when energized, constant heating current to said electrical heating element to heat said thermoluminescent material to its critical temperature in substantially the same time for each dosimeter;

a photomultiplier tube disposed adjacent said dosimeter for detecting the glow of said thermoluminescent material while it is being heated and producing an electrical signal proportional to the amplitude of said glow, including a peak signal proportional to said glow peak;

a high voltage power supply connected to said photomultiplier tube for furnishing high voltage thereto;

a chart recorder for recording, when energized, said electrical signal including said peak signal, and having a drive motor adapted to drive said chart at constant speed so that said signal is recorded at a constant rate, a pen and associated mechanism for tracing the chart record, a limit switch mechanically mounted so as to close when said pen reaches the limit of excursion, and a cam switch mechanically mounted so as to close only while said pen traces a record between two known points on said chart; and control circuitry having a first control circuit, including a first switch that closes when said dosimeter is inserted in said apparatus, interconnected so as to energize said drive motor of said chart recorder, a second control circuit interconnected with said cam switch and said first control circuit so as to thereafter energize said regulated power supply to furnish constant current to said heating element, and a range step switch interconnected with said limit switch so as to change the range of said chart recorder each time said pen reaches the limit of its excursion.

8. Apparatus as in claim 7 further comprising means for calibration thereof with a thermoluminescent standard.

9. A thermoluminescent dosimetery system comprising:

a thermoluminescent dosimeter having an electrical heater element disposed adjacent thermoluminescent material that glows and produces a characteristic gamma radiation glow peak when heated above a critical temperature, which glow peak is a measure of the gamma radiation dose;

a thermoluminescent standard having an element with the same configuration as said electrical heater, said element being coated with a mixture of said thermoluminescent material and an isotope that emits ionizing radiations causing said thermoluminescent material to fluoresce, producing light that is the equivalent of a known gamma radiation dose; and apparatus for determining the total gamma radiation dose to which said dosimeter has been subjected comprising means for heating said electrical heater element at a constant rate, means for detecting the glow of said thermoluminescent material and producing an electrical signal proportional to its amplitude, means for recording at a constant rate said signal on a chart, means for synchronizing said foregoing means to record the gamma radiation peak always at the same location on said chart, and means for calbrating said apparatus with said standard.

References Cited

UNITED STATES PATENTS

| | | | |
|---|---|---|---|
| 2,666,857 | 1/1954 | McLaren et al. | 250—83 X |
| 2,750,986 | 6/1956 | Russell et al. | 250—83.3 X |
| 3,093,734 | 6/1963 | Just | 250—71.5 X |
| 3,098,156 | 7/1963 | Work | 250—83 X |
| 3,115,578 | 12/1963 | Schulman | 250—71 |
| 3,176,133 | 3/1965 | McCall et al. | 250—71.5 |
| 3,288,997 | 11/1966 | McCall | 250—71.5 |

ARCHIE R. BORCHELT, *Primary Examiner.*